(12) United States Patent
Yde-Andersen et al.

(10) Patent No.: US 6,420,065 B1
(45) Date of Patent: Jul. 16, 2002

(54) WOUND ELECTROCHEMICAL CELL, A METHOD FOR THE MANUFACTURE THEREOF, AND USE OF SUCH ELECTROCHEMICAL CELLS

(75) Inventors: Steen Yde-Andersen, Odense S (DK); Ilmari Katva, deceased, late of Odense C (DK), by Grethe Laursen, executor (73) Assignees: Danionics A/S, Odense S; Oticon A/S, Hellerup, both of (DK)

(*) Notice: Subject to any disclaimer, the term of this patent is extended or adjusted under 35 U.S.C. 154(b) by 0 days.

(21) Appl. No.: 08/983,360

(22) PCT Filed: Jul. 8, 1996

(86) PCT No.: PCT/DK96/00309

§ 371 (c)(1),
(2), (4) Date: Mar. 12, 1999

(87) PCT Pub. No.: WO97/03475

PCT Pub. Date: Jan. 30, 1997

(30) Foreign Application Priority Data

Jul. 7, 1995 (DK) ................................................ 0800/95

(51) Int. Cl.[7] .......................... H01M 4/00; H01M 2/26; H01M 6/00
(52) U.S. Cl. ........................ 429/94; 429/161; 429/162; 429/211; 29/623.1
(58) Field of Search ........................ 429/94, 161, 162, 429/211; 29/623.1

(56) References Cited

U.S. PATENT DOCUMENTS

| | | | |
|---|---|---|---|
| 3,761,314 A | | 9/1973 | Cailley |
| 4,879,190 A | * | 11/1989 | Lundsgaard ................. 429/94 |
| 4,963,446 A | | 10/1990 | Roels et al. |
| 5,288,564 A | * | 2/1994 | Klein et al. ................... 429/94 |
| 5,368,961 A | * | 11/1994 | Juergens ..................... 429/233 |
| 5,434,017 A | * | 7/1995 | Berkowitz et al. ............ 429/94 |
| 5,707,758 A | * | 1/1998 | Iwatau et al. ................. 429/94 |

FOREIGN PATENT DOCUMENTS

| | | |
|---|---|---|
| EP | 0 397 248 | 11/1990 |
| GB | 2 126 411 | 3/1984 |
| WO | WO 86/03889 | 7/1986 |

* cited by examiner

*Primary Examiner*—Carol Chaney
*Assistant Examiner*—Tracy Dove
(74) *Attorney, Agent, or Firm*—Darby & Darby (57) ABSTRACT

The present invention relates to an electrochemical cell composed of a laminate of two electrode structures in the form of current collectors coated with electrode material interposed electrolyte structures. The laminate is wound in a coil, and in at least the initial turn and the final turn, one of the current collectors has a protruding part extending beyond at least one of the edges of the other current collector in the same turn and in the following or previous turn, respectively, and the first current collector has a protruding part extending beyond one of the edges of the second collector foil, the protruding parts of the current collectors along the first and the second edge, respectively, of the laminate are sealed to each other optionally with interposed insulating polymer material.

38 Claims, 5 Drawing Sheets

WOUND ELECTROCHEMICAL CELL, A METHOD FOR THE MANUFACTURE THEREOF, AND USE OF SUCH ELECTROCHEMICAL CELLS

This is a national phase application under 35 U.S.C. §371 of International Application No. PCT/DK96/00309, filed Jul. 8, 1996, and claims the benefit under 35 U.S.C. §119 of Denmark Patent Application No. 0800/95, filed Jul. 7, 1995.

CROSS-REFERENCES TO RELATED APPLICATIONS

This application is a 317 of PCT/DK96/00309 filed Jul. 8, 1996.

BACKGROUND OF THE INVENTION

1. Field of the Invention

The present invention relates to a wound electrochemical cell, a method for the manufacture thereof and the use of such electrochemical cells.

2. Description of the Related Art

Several types of wound electrochemical cells are known in the art and have been described in the literature. In general a wound cell is composed of a laminate of a cathode material, an anode material, and interposed separators which include an electrolyte. The laminate is wound in a coil, connected to current collectors, and incorporated in a battery case to provide mechanical stability and sealing of the cell.

In some electrochemical cells the current collectors are integral parts of the laminate. Such an electrochemical cell is described in WO 86/03889. In this electrochemical cell the coiled laminate comprises an anode structure in the form of a current collector coated with anode material and a cathode structure in the form of a current collector coated with cathode material. In order to provide a uniform resistance throughout the battery, one of the current collectors has a bare border free of electrode material. This bare border extends beyond the other elements of the coil and is arranged so as to cover the outside of the coil and thereby improve the electrical contact between the current collector and the metal case into which the coil is fitted.

U.S. Pat. No. 3,761,314 discloses a similar electrical cell composed of a coiled laminate comprising an anode structure in the form of a current collector or metal carrier coated on both sides with anode material and a cathode structure in the form of a current collector or metal carrier coated on both sides with cathode material.

The anode metal carrier has a bare edge free of anode material, which edge projects outwardly from one end of the assembly, and the cathode metal carrier has a bare edge free of cathode material, which edge projects outwardly from the opposite end of the assembly. The edge of the anode metal carrier, respectively, and the cathode metal carrier is turned down into overlapping fish scale-like flanges and serves to define and form substantially plane elastically deformable area surfaces at opposite ends of the assembly. When this assembly is sealed in a metal casing, an intimate contact between the respective poles of the casing and the opposite ends of the assembly is obtained.

A similar coiled electrochemical cell is disclosed in U.S. Pat. No. 4,963,446. In this cell, protruding exposed edges of a foil carrier or current collector for the cathode are indented inwardly at intervals to facilitate placement of an insulator ring at the top of the cell after the electrodes have been inserted into a cylindrical metal container, and after fluid electrolyte material has been poured into the cell between the intervals of the indentings. The anode is in contact with the metal container wall and bottom, which thereby serves as the anode terminal. An insulating material is provided between the wall and the cover. The inwardly indented edges of the current collector for the cathode result in an effective insulation of these protruding exposed edges from the container wall, and at the same time in good continuity of contact to a pressure contact in the cover, which serves as the cathode terminal.

A marked property of wound cells as described above is that they are very stable and compact. Further, the wound cell concept with thin electrode plates may result in superior discharge/recharge characteristics. However, there is still a need for improving the compactness.

BRIEF SUMMARY OF THE INVENTION

The object of the present invention is to provide a wound electrochemical cell which is more compact than known wound electrochemical cells. In particular the object of the present invention is to provide a lightweight, wound electrochemical cell which is physically stable and which has discharge/recharge characteristics which are at least as good as those of known wound electrochemical cells.

Further, the wound electrochemical cell according to the invention exhibits discharge/recharge characteristics which are at least as good as those of known wound electrochemical cells, is sufficiently physically stable to be handled under normal circumstances of packaging, transportation and use, and may at the same time be very light and small.

DETAILED DESCRIPTION OF THE INVENTION

The wound electrochemical cell according to the invention is formed as defined below.

By the term "coil edge" is meant the edge of the final coil, whereas "the edge of the laminate" refers to the edge in each turn or winding of the coil.

By the terms "initial turn" and "final turn", respectively, is meant the first and last turn or winding, respectively, of the laminate. The wound material is designated "laminate" even in the area where it consists only of one material.

It should be noted that the length of the laminate may be shorter or longer than the width of the laminate.

The electrochemical cell of the invention, as defined in the claims, is very stable, and due to the fact that it does not need a stabilizing metal cover or casing it is also very small and light compared to known wound batteries.

Preferably, the protruding parts of the current collectors along the first and the second encircling edge, respectively, of the laminate are sealed to each other to provide a first and a second coil edge in the form of a first and a second encircling sealing line to which all of the protruding parts of the current collectors are sealed.

Naturally, the electrode structures of opposite polarity may not come into physical contact with each other, as this would result in short-circuiting of the cell, and, as mentioned, non-electrode-coated parts of the first and the second collector foil may therefore be isolated from each other by use of a non-conducting material. This non-conducting material is preferably a polymer material e.g. in the form of a hot-melt glue.

Such hot-melt glue may also be used as the interposed insulating material between the sealed protruding parts of the current collectors. However, other materials, such as a polyolefine foil, may be used as both isolating and insulating materials.

By using a hot-melt glue for sealing the protruding parts of the current collectors it is very easy to produce the cell, as will be explained later on.

Preferred hot melt glues or adhesives are selected from thermoplastic polymer groups comprising acrylics, polyamides, polyesters, ethylenevinylacetates, polyethylene and polypropylene and thermoplastic elestomers.

Gluing systems based on thermosetting polymers like epoxides, phenolics, urethanes and silicones may also be used.

The above mentioned sealing materials are optionally metal- or carbon filled as to provide electrical contact.

In a preferred embodiment of the electrochemical cell of the invention the second current collector also has a protruding part extending beyond the first and/or the second edge of the first collector foil in at least the initial turn and/or the final turn, the protruding part is preferably partly or totally free of electrode material.

This preferred embodiment is particularly physically stable, and is able to withstand handling under normal circumstances of packaging, transportation and use.

It should be noted that in the situations where the protruding parts of the current collectors are not free of electrode material it is necessary to cover and to eliminate any electrode porosity of this electrode with a non-conductive and water impermeable film, preferably of a polyolefine material, prior to the sealing of the material.

The electrode may be of any kind and of any known combinations. Preferably, one of the first and second electrode materials is an anode material, and the other one of the first and second electrode materials is a cathode material.

The cathode material comprises as electrochemically active material preferably one or more of spinel lithium manganese oxides, lithium cobalt oxides, lithium nickel oxides, or vanadium oxides, preferably $V_6O_{13}$, or titanium disulphide. The anode material comprises as electrochemically active material preferably a Li-intercalated carbon material.

Such cathode materials and anode materials as well as electrolyte materials are well known in the art.

The electrolyte structure in the electrochemical cell of the present invention may have any form and be of any kind as long as it is able to fulfil its purpose, namely to conduct ions and prevent conduction of electrons. The electrolyte structure is preferably in the form of a microporous plastic film prepared with a liquid, solid or immobilized electrolyte, more preferably electrolyte structure comprises:

a salt, which salt is an alkali salt or a quaternary ammonium salt of $ClO_4^-$, $CF_3SO_3^-$, $AsF_6^-$, $PF_6^-$ or $BF_4^-$, or any mixture of such alkali or ammonium salts, preferably $LiAsF_6$, $LiPF_6$, $N(Et)_4PF_6$ or $N(BU)_4PF_6$ or any mixtures thereof;

any solvent or mixtures thereof selected from a group comprising alicyclic carbonates, aliphatic carbonates, lactones, esters and glymes;

a separator consisting of a porous structure made from a polymer, preferably polyethylene, polypropylene, polyesters, polycarbonates or cellulose;

and optionally, a crosslinked or non-crosslinked, preferably non-crosslinked, polymer produced by UV or heat induced polymerization of monomers and oligomers containing one or more polymerizable functional groups, said polymer more preferably being a non-cross-linkable polyester, polyurethane, polyether or polyacrylate.

The current collectors should be of a solid, conducting material. Preferably the current collectors independently of each other are selected from electrical conductive foils, preferably metal foils, in particular aluminium, copper or nickel foils. The foils may have any thickness, it, however, being preferred that the thickness of the current collectors is between 5 and 40 $\mu$m, most preferably between 5 and 25 $\mu$m.

The electrochemical cell of the invention has preferably at least three turns in its coil, however it more preferred that it has at least 5 turns.

It may have as many turns as it is physically possibly to wind, however, it is particularly preferred that the number of turns is between 7 and 20 turns and most preferably between 8 and 15 turns.

In a preferred embodiment of the invention the laminate in at least the initial turn, and preferably in at least five initial turns (the first five turns of the coil) consists of the first current collector foil alone. The width of the first current collector foil in at least this initial turn or turns is preferably wider than that of the second current collector foil and extends beyond one or both of the edges of the first turn of the second current collector foil so as to form protruding parts. This/these initial turn or turns of the first current collector foil may be coated with electrode material on the side facing away from the centre axis of the coil, but is/are preferably non-electrode-coated parts.

By "the first turn of the second current collector" is meant the innermost turn of the laminate also comprising the second current collector.

In another or the same preferred embodiment of the invention the laminate in at least the final turn, and preferably in at least five final turns (the last five turns of the coil) consists of the second current collector foil alone. The width of the second current collector foil in at least this/these final turn or turns is/are preferably wider than that of the first current collector foil and extends beyond both of the edges of the last turn of the first current collector foil so as to form protruding parts. This final turn or turns of the second current collector foil may be coated with electrode material on the side facing the center axis of the coil, but is/are preferably non-electrode-coated parts.

By "the last turn of the first current collector" is meant the outermost turn of the laminate also comprising the first current collector.

In a very preferred embodiment protruding parts of the first current collector foil along the first and the second edge, respectively, of the laminate are sealed to protruding parts of the second current collector foil along the first and the second edge, respectively, of the laminate, the sealing extending along a first and a second encircling edge, respectively, of the cell. More preferably the encircling edges also define the edges of an axial hole in the coil.

In this embodiment it is also preferred that the protruding parts in the final turn or turns of the first and/or the second current collector foil along at least one of the first and the second edge, respectively, of the laminate is/are folded inwardly, preferably into an axial hole, and sealed to the inner surface of the cell or brought into sealing contact with the outer surface of a protruding part in the initial turn.

By "the inner surface of the cell" is meant the surface of the wall facing the axial hole, and by "the outer surface of a protruding part in the initial turn" is meant the surface of the protruding part of the laminate in the initial turn facing away from the axial hole.

In the above described preferred embodiments it is preferred that the cell has a positive terminal provided by the outer surface of the cell, and a negative terminal provided by the inner surface or vice versa.

In another preferred embodiment of the electrochemical cell according to the invention the first current collector foil has a protruding part extending beyond the second current collector foil substantially along the whole length of the first edge, and the second current collector foil has a protruding part extending beyond the first current collector foil substantially along the whole length of the second edge. The protruding part of the first current collector foil is sealed to itself preferably along an encircling edge and along a core line, and the protruding part of the second current collector foil is sealed to itself preferably along an encircling edge and along a core line.

By the term "core line" is meant a line having a right angle to the axis of the coil.

More preferably the cell is formed as a substantially flat coil in plane with the core line and preferably it has an essentially flat rectangular core element.

The core element may e.g. be a flat core element in the form of two substantially rectangular plates having flat surfaces turned towards each other and slightly rounded surfaces turned away from each other. However, the core element may have any suitably form and may be made of any kind of material such as polymer material or compressed cellulose fibres.

This embodiment preferably also comprises an insulating cover film, which film, except for the protruding parts of the current collector foils, covers the cell.

This insulating cover film is preferably a polymer film, most preferably a polyolefine film. The cover film is preferably glued onto the cell.

The present invention furthermore relates to a method for the manufacture of a wound electrochemical cell, comprising the steps as defined in claim 19.

By use of the method according to the invention it is very simple and economically advantageous to prepare such electrochemical cells. In particular it is an advantage that the electrochemical cells can be prepared according to this method by use of very simple equipment.

The protruding parts of the current collector(s) are preferably sealed by gluing, and most preferably by use of a hot-melt glue.

The preferred hot-melt glues are as mentioned above. The sealing is provided upon pressing the protruding parts of the current collector, covered with said glue, preferably at a pressure of $10^5$–$10^8$ N/m$^2$ and at a temperature of 20–180° C. for a period of 2–600 s.

The glue may beneficially be coated onto the protruding parts before the laminate is wound and after winding the protruding parts are pressed together in the desired configuration and optionally heated as mentioned above if a hot-melt glue is used.

Optional interposed insulating material and optional insulating cover film may as well be coated with glue prior to winding and after winding, these parts are pressed together in the desired configuration and optionally heated if a hot-melt glue is used.

For easy control of the winding step the laminate is preferably wound onto an element which may be removed after winding.

In one preferred embodiment the laminate is wound onto a rod-shaped element. More preferably the laminate is wound onto a cylindrical mandrel to form an electrochemical cell with a substantially cylindrical axial hole. In this embodiment the method preferably further comprises the step of folding the protruding parts in the final turn or turns of the first and/or the second current collector foil inwardly along at least one of the first and the second edge, respectively, of the laminate and more preferably inwardly into an axial hole, and sealing these inwardly folded parts to the inner surface of the cell or to the outer surface of a protruding part in the initial turn.

In a variant of this embodiment, the laminate is wound onto a flat core. In this embodiment the protruding parts of the current collectors are preferably pressed together e.g. with interposed glue so as to seal off the cell. Further, it is preferred that the method in this embodiment further comprises the step of winding an electrically insulating cover film, preferably coated with glue onto the wound battery laminate.

In the above described embodiment it is preferred that the electrochemical cell has a negative terminal in a first coil edge provided by the protruding part of the first electrode structure surface of the cell and a positive terminal in a second coil edge provided by the protruding part of the second electrode structure or vice versa.

The electrochemical cell of the invention may be used in any battery operating equipment such as toys, music equipments, computers and portable tools and telephones. A preferred use of electrochemical cells as defined in the claims is the use in hearing aids.

This use is particularly advantageous, because the electrochemical cell of the invention is very small and light, and may be prepared with an axial hole.

Referring now to FIGS. 1 to 6 which show the elements of and the first preferred embodiment of the electrochemical cell of the present invention, and the production thereof. This embodiment is made from a laminate comprising a first electrode structure 200, which comprises an anode material, a second electrode structure 230, which comprises a cathode material, and two electrolyte structures 220, 221 being interposed between the anode structure and the cathode structure and above the cathode structure, respectively. It should be understood that the anode and cathode materials could be mutually interchanged.

Figure 1:
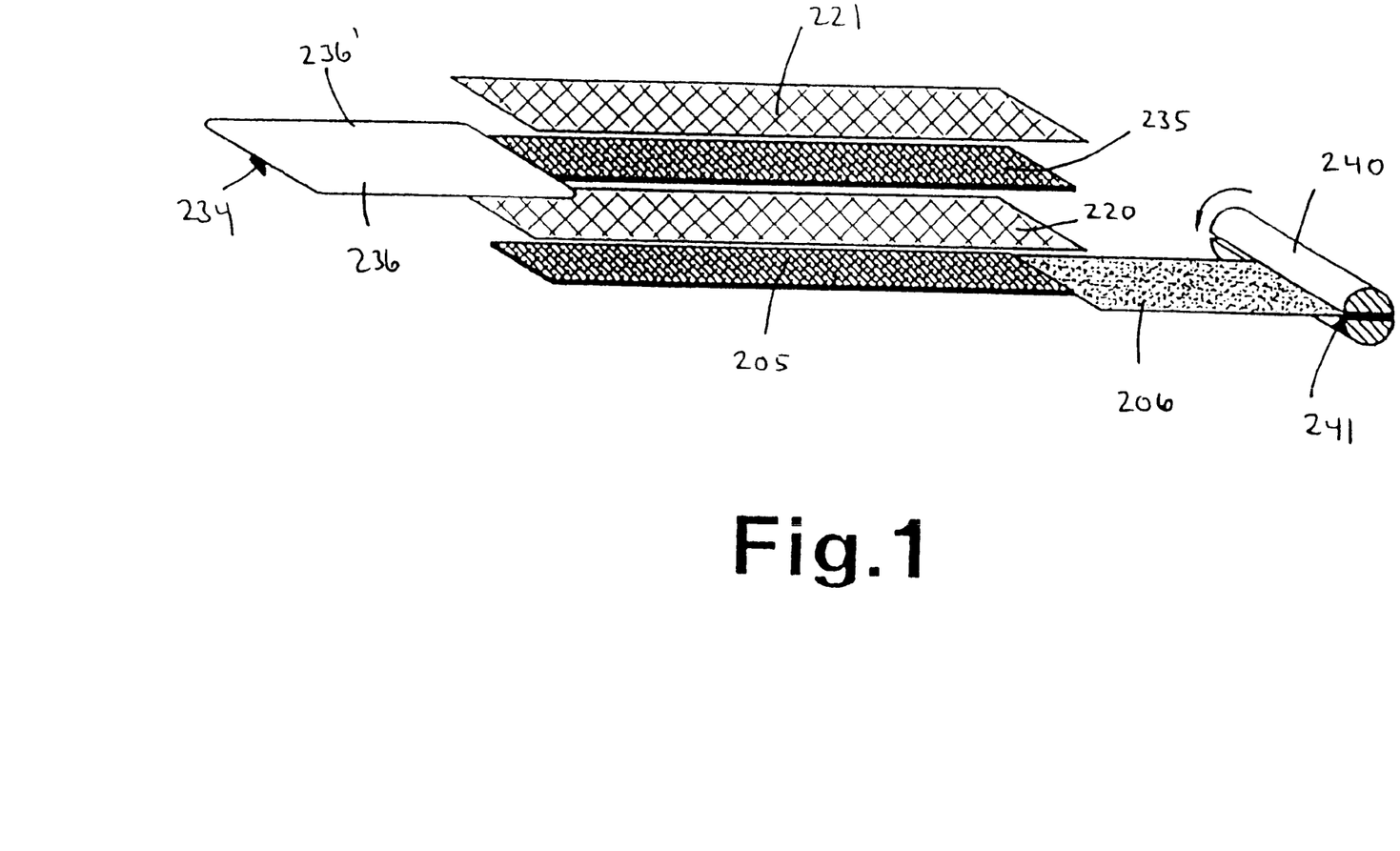
FIG. 1 is an exploded view of a laminate for the production of a tubular embodiment of the electrochemical cell according to the invention, prior to the winding step.
Figure 2:
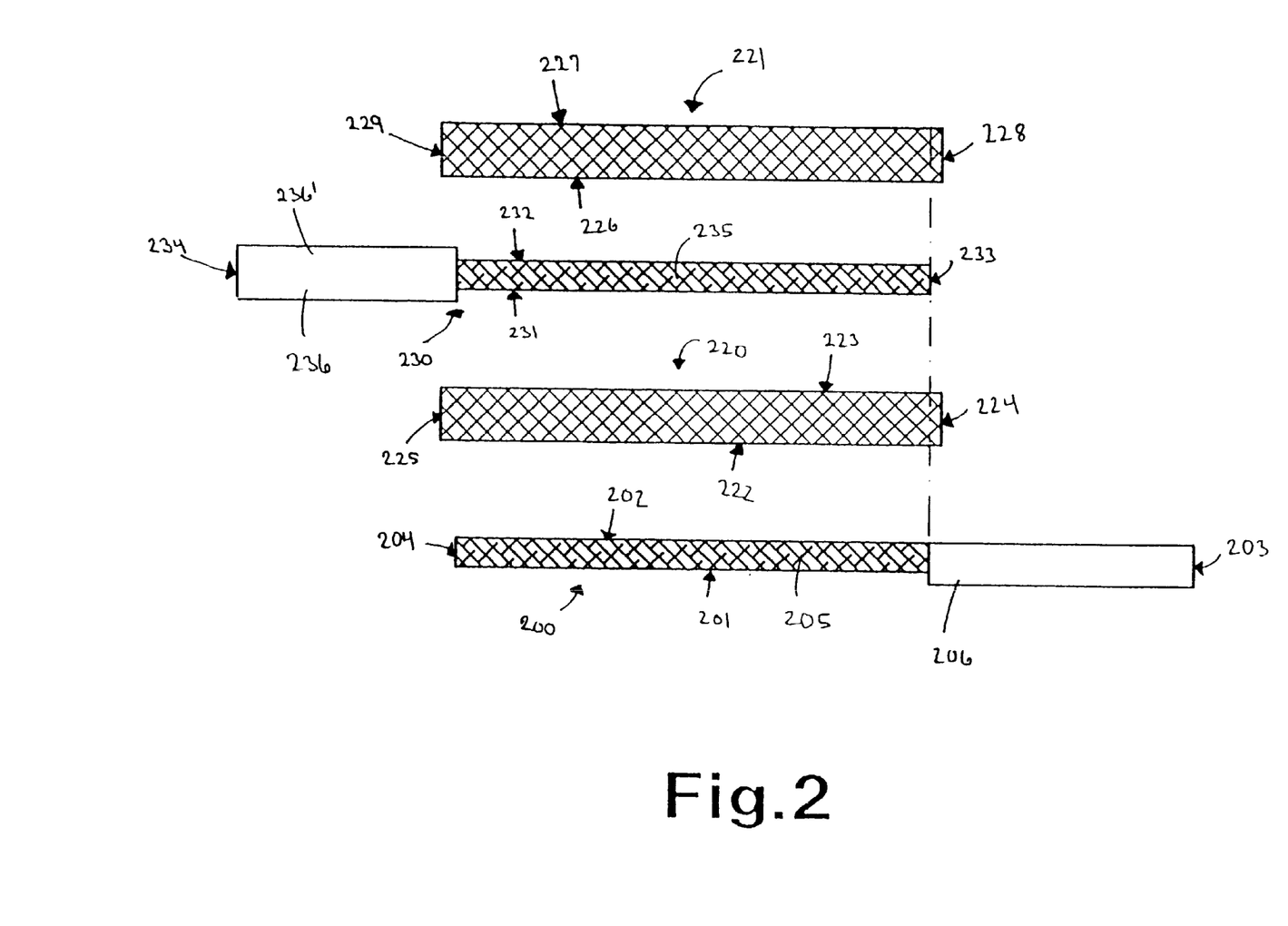
FIG. 2 schematically shows the electrode structures and the electrolyte structures of the laminate shown in FIG. 1.

The electrode structures 200, 230 and the electrolyte structures 220, 221 are also referred to as strips.

The electrode structures 200, 230 have a length and a width, a first edge 201, 231 and a second edge 202, 232, respectively, extending along the length thereof and a first end 203, 233 and a second end 204, 234, respectively, extending along the width thereof. The electrode structures 200, 230, respectively, consist of a first and a second current collector metal foil, which in this situation is a copper foil and an aluminium foil, respectively, coated on at least a part 205, 235 of its first side and a part of its second, not shown, side with electrode material.

The first current collector has a protruding part 206 extending beyond the first edge 231 of the second collector foil, and further, the part of the first electrode structure 200, extending from its first end 203 and being wider than the part of the first electrode structure 200 extending from its second end 204, is free of electrode material. The second current collector has a first and a second protruding part 236, 236' extending beyond the first edge 201 and the second edge 202 of the first collector foil, respectively, and further, the part of the second electrode structure 230, extending from its second end 234 and being wider than the part of the second electrode structure 230 extending from its first end 233, is free of electrode material.

The electrolyte structures 220, 221, respectively, have a length and a width, a first edge 222, 226 and a second edge 223, 227 extending along the length thereof and a first end 224, 228 and a second end 225, 229 extending along the width thereof. The length of the electrolyte structures 220, 221, respectively, is slightly longer than the length of the coated parts 205, 235 of the electrode structures 200, 230 and the width of the electrolyte structures 220, 221, respectively, is slightly broader than the width of the coated parts 205, 235 of the electrode structures 200, 230.

The electrode structures 200, 230, and the electrolyte structures 220, 221 are placed on top of each other as shown in FIG. 1. A core element 240 in the form of a cylindrical mandrel having an axial slit line 241 is used in the winding procedure. The first end 203 of the laminate, which consists of the first current collector alone, is inserted into the slit 241, and the core element 240 is rolled until the whole of the laminate is wound. Prior to the winding procedure, the protruding parts 206, 236, 236' have been coated with a not shown glue.

Figure 3:
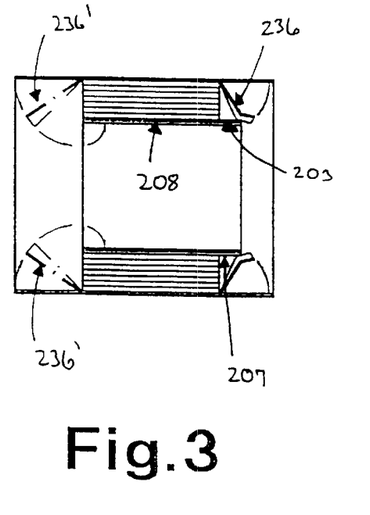
FIG. 3 is a schematical drawing of the wound laminate of FIG. 1 in the sealing step.
Figure 4:
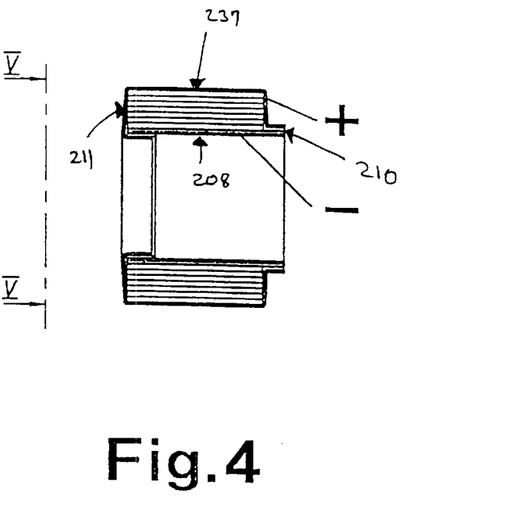
FIG. 4 is a schematical drawing of the wound and sealed laminate of FIG. 1.

After the winding procedure the cylindrical mandrel 240 is removed, and the protruding parts 206, 236, 236' are sealed along a first and a second encircling sealing line to provide a first and a second encircling sealing line to provide a first and a second coil edge 210, 211, as illustrated in FIG. 4. The first protruding part 236 of the second current collector 230 is folded inwardly into contact with the outer surface 207 of the protruding part 1203 of the first current collector, and these protruding parts 236, 203 are sealed to each other and to themselves in the windings e.g. by applying heat. If the glue used has an insulating effect, it is not necessary to provide a further insulator between the protruding parts 203, 236; otherwise an insulator must be interposed between the first protruding part 236 of the second current and the protruding part 203 of the first current collector in order to prevent short-circuiting of the cell. The second protruding part 236' of the second current collector 230 is folded inwardly into the axial hole 250 of the cell and sealed by use of the glue to the inner surface 208 of the cell, and further the protruding part 236' is sealed to itself in the windings. If the glue used has an insulating effect, it is not necessary to provide a further insulator between the protruding part 236' and the inner surface 208; otherwise an insulator must be interposed in order to prevent short-circuiting of the cell.

Figure 5:
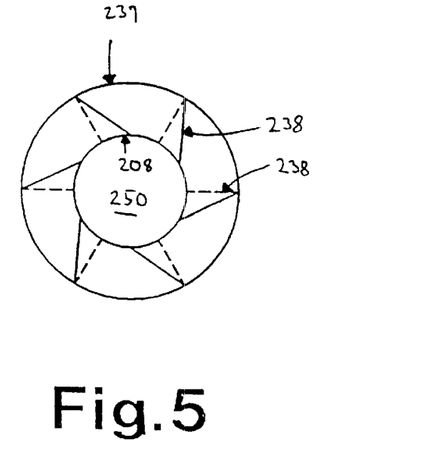
FIG. 5 is a view of the electrochemical cell of FIG. 4 taken along the section cut line V—V.

The sealed and finished electrochemical cell as shown in FIGS. 4 and 5 has a positive terminal provided by the outer surface of the cell, and a negative terminal provided by the inner surface 208 of the cell. The inwardly folded parts have folding lines 238 in order to provide plane surfaces of the folded parts.

Figure 6:
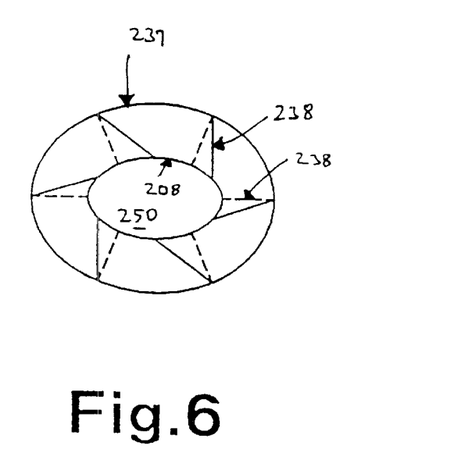
FIG. 6 is a view of a variant of the electrochemical cell of FIG. 4 taken along the section cut line V—V.

A variant of the electrochemical cell in FIGS. 4 and 5 is shown in FIG. 6. This electrochemical cell differs from the electrochemical cell in FIGS. 4 and 5 only in that it has been pressed slightly into a elliptical shape.

Figure 7:
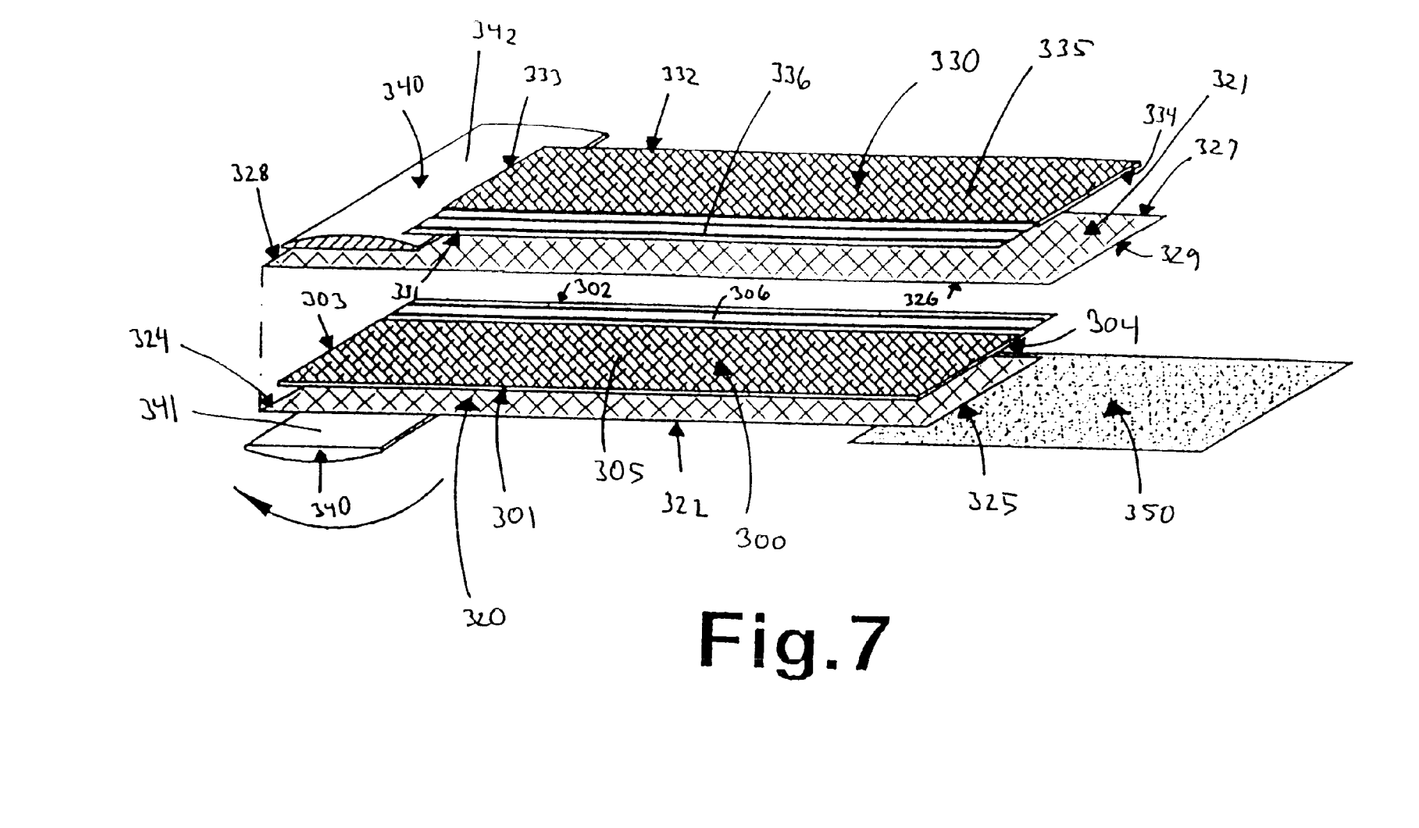
FIG. 7 is an exploded view of a laminate for the production of a flat embodiment of the electrochemical cell according to the invention, prior to the winding step.
Figure 8:
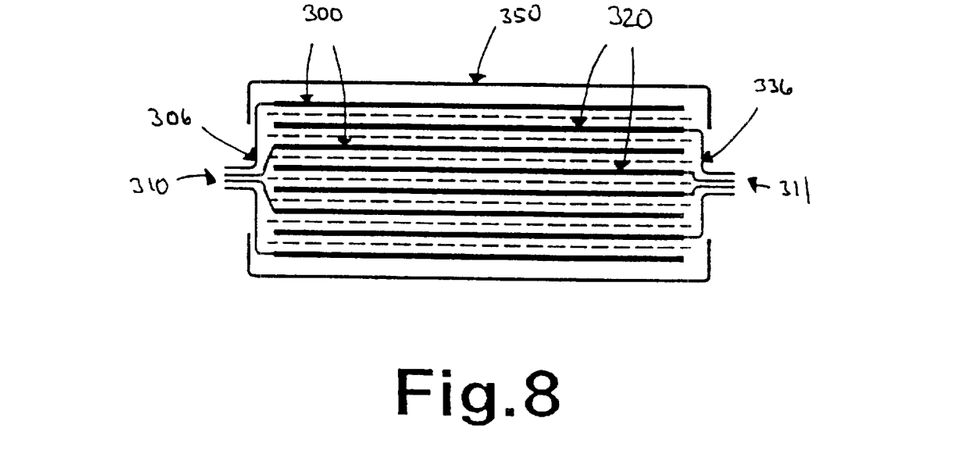
FIG. 8 is a cross-sectional view of the wound electrochemical cell produced from the laminate shown in FIG. 7 taken along the section cut line X—X in FIG. 9.
Figure 9:
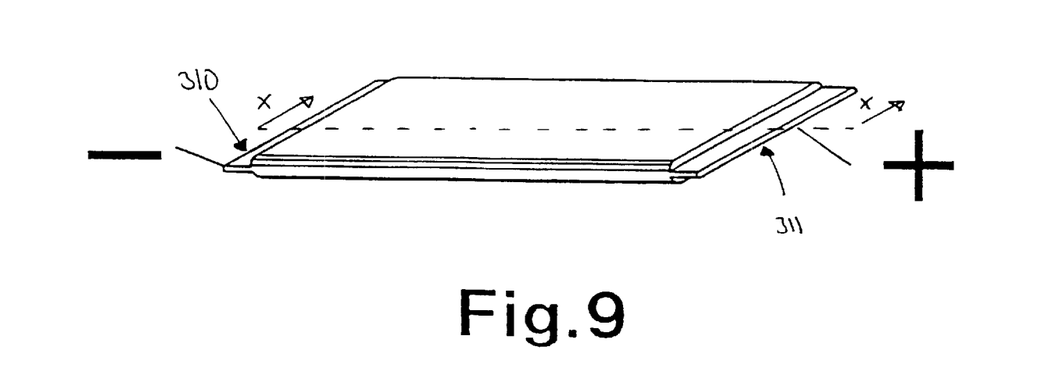
FIG. 9 is a schematical drawing of the wound electrochemical cell produced from the laminate shown in FIG. 7.

Referring now to FIGS. 7 to 9 which show the elements of and the second preferred embodiment of the electrochemical cell of the present invention, and the production thereof. This embodiment is made from a laminate comprising a first electrode structure 300, which comprises an anode material, a second electrode structure 330, which comprises a cathode material and two electrolyte structures 320, 321 being placed below the cathode structure and interposed between the anode structure and the cathode structure respectively. It should be understood that the anode and cathode materials could be mutually interchanged.

The electrode structures 300, 330 and the electrolyte structures 320, 321 are also referred to as strips.

The electrode structures 300, 330 have a length and a width, a first edge 301, 331 and a second edge 302, 332, respectively, extending along the length thereof, and a first end 303, 333 and a second end 304, 334, respectively, extending along the width thereof. The electrode structures 300, 330, respectively, consist of a first and a second current collector metal foil, which in this situation is a copper foil and an aluminium foil respectively, coated on at least a part 305, 335 of its first side and a part of its second, not shown, side with electrode material.

The first current collector has a protruding part 306 extending beyond the second edge 332 of the second collector foil in its whole length, and this protruding part 306 is free of electrode material. The second current collector has a protruding part 336 extending beyond the first edge 301 of the first collector foil in its whole length, and this protruding part 336 is free of electrode material. The second electrode structure 330 is shorter than the first electrode structure 300.

The electrolyte structures 320, 321, respectively, have a length and a width, a first edge 322, 326 and a second edge 323, 327 extending along the length thereof and a first end 324, 328 and a second end 325, 329 extending along the width thereof. The length of the electrolyte structures 320, 321, respectively, is slightly longer than the length of the coated part 305 of the first electrode structure 300, and the width of the electrolyte structures 320, 321, respectively, is slightly broader than the width of the coated parts 305, 335 of the electrode structures 300, 330.

The electrode structures 300, 330, and the electrolyte structures 320, 321 are placed on top of each other as shown in FIG. 7, so that the first ends 304, 334 of the electrode structures are placed above each other, and a polymer cover film strip 350 is placed below the laminate so that its covers the second end. The cover film is broader than any of the electrolyte structures 320, 321 and sufficiently long to cover the outer surface of the wound laminate.

A flat core element 340 in the form of two substantially rectangular plates having flat surfaces 341 turned towards each other and slightly rounded surfaces 342 turned away from each other is used in the winding procedure. The first end of the laminate which consists of the first electrode structure 300 and the electrolyte structures 320, 321 is inserted between the plates 340, and the core element 340 is rolled until the whole of the laminate and the cover film are wound. Prior to the winding procedure, the protruding parts 306, 336 and the side of the cover film facing the laminate when wound have been coated with a not shown glue.

After the winding procedure the protruding parts 306, 336 are pressed together and sealed to themselves along a first and a second encircling edge in the windings and along a first and a second core line parallel to each other to provide a first and a second coil edge 310, 311 as illustrated in FIGS. 8 and 9. It is not necessary to use a glue with an insulating effect or to provide a further insulator between the windings of the protruding parts or in the core lines because there is no risk of short-circuiting the cell. In fact a conductive glue may provide an improved contacting.

The sealed and finished electrochemical cell as shown in FIG. 9 has a negative terminal in the first coil edge 310 provided by the protruding part 306 of the first electrode structure surface of the cell, and a positive terminal in the second coil edge 311 provided by the protruding part 336 of the second electrode structure.

The following examples illustrate production of two different preferred embodiments of the electrochemical cell according to the invention.

EXAMPLE 1

A substantially flat, rectangular electrochemical cell is produced in the following manner:

A copper strip having a thickness of 15 $\mu$m, a length of 450 mm and a width of 93 mm is coated on both sides with a 58 $\mu$m thick layer of an anode material consisting of a mixture of coke, $LiPF_6$ and polyvinylidene fluoride as a binder, except for a 3 mm first edge part which is left uncoated. A 92 mm wide microporous plastic film (Celgard 2500) having a thickness of 30 $\mu$m and a length of 450 mm, prepared with a thermosetting electrolyte composed of 110 parts by weight of $LiPF_6$, 710 parts by weight of a 1:1 solvent mixture of ethylene carbonate and triglyme, 200 parts by weight of 2-(2-ethoxyethoxy) ethyl acrylate, and 30 parts by weight of polyethylene oxide, is placed on top of said copper strip, two protruding parts of said plastic film having a width of 1 mm, respectively, extending beyond the first and the second edge of the coated part of the copper strip. Then an aluminium strip having a thickness of 15 $\mu$m a length of 450 mm, and a width of 93 mm, which strip is coated on both sides with a 108 $\mu$m thick layer of a cathode material consisting of a mixture of carbon black and $LiMn_2O_4$, except for a 3 mm second edge part which is left uncoated, is placed on top of the above-mentioned plastic film, so that the uncoated second edge part is protruding outwardly beyond the second edge of the copper strip in the opposite direction of the said first edge of the copper strip. A second plastic film similar to the above-referred plastic film and prepared with a similar electrolyte is placed on top of said aluminium strip, two protruding parts of said plastic film having a width of 1 mm, respectively, extending beyond the first and the second edge of the coated part of the aluminium strip. Then two stripes having a width of 1.5 mm of a hot-melt glue (3M no. 3792) are deposited on the upper side of the oppositely protruding edge parts of the copper strip and the aluminium strip, respectively.

The resulting battery laminate is wound onto a flat core having a width of 33.7 mm, and a thickness of 2.0 mm. A 92 mm wide cover film coated with hot-melt glue (3M no. 3792) is wound onto the battery laminate approximately one and a half turn, thus forming an insulating layer on said laminate.

The protruding parts of copper and aluminium foils protruding from opposite ends of the wound cell are pressed by a hot tool at $10^7$ N/m$^2$ at 140° C. for 20 s so as to seal off the cell. Said portions, which are punched to a desired length, provide the negative and positive terminals, respectively, of the produced electrochemical cell.

The electrochemical cell obtained is hermetically sealed, and more particularly the current collector metal foils provide a water-impermeable seal.

EXAMPLE 2

A substantially cylindrical electrochemical cell having an axial hole is produced in the following manner:

A 162 mm long strip of copper foil having a thickness of 15 $\mu$m, and a width of 5 mm on the first 100 mm and a width of 7 mm on the last 62 mm is coated on said first 100 mm on both sides with a 58 $\mu$m thick layer of an anode material consisting of a mixture of coke, $LiPF_6$ and polyvinylidene fluoride as a binder. The remaining 62 mm piece of the strip, which protrudes by 2 mm beyond the first edge of the 100 mm piece in one direction, is coated on the below side of the protruding part with a hot-melt glue (3M no. 3792). A 100 mm×6 mm strip of a microporous plastic film (Celgard 2500) is placed on top of the coated part of the current collector, two protruding parts of said plastic film having a width of 0.5 mm, respectively, extending beyond the first and the second edge of the coated part of the copper strip. The plastic film is prepared with a thermosetting electrolyte composed of 110 parts by weight of $LiPF_6$, 710 parts by weight of a 1:1 solvent mixture of ethylene carbonate and triglyme, 200 parts by weight of 2-(2-ethoxyethoxy)ethyl acrylate, and 30 parts by weight of polyethylene oxide. A 145 mm long strip of aluminium foil having a thickness of 15 $\mu$m, and a width of 11 mm on the first 45 mm and a width of 5 mm on the last 100 mm, is coated on said last 100 mm on both sides with a 108 $\mu$m thick layer of a cathode material consisting of a mixture of carbon black and $LiMn_2O_4$. The remaining 45 mm piece of strip, which protrudes by 3 mm beyond the first and the second edge of the 100 mm piece, is coated on top with a hot-melt glue (3M no. 3792). This aluminium strip is placed on top of the plastic film so that its coated part covers said plastic film, and said 45 mm piece of uncoated aluminium strip protrudes from the laminate in the opposite direction of the protruding part of the copper strip. Finally, a second 100 mm×6 mm strip of plastic film (Celgard 2500) is placed on top of the coated part of this aluminium current collector, two protruding parts of said plastic film having a width of 0.5 mm, respectively, extending beyond the first and the second edge of the coated part of the aluminium strip. This piece of plastic film is also prepared with the above-mentioned electrolyte.

The resulting battery laminate is wound on a cylindrical mandrel (diameter=3.6 mm) starting from the end from which the 62 mm piece of anode current collector protrudes. Thus, the initial turns are provided by the protruding copper foil only, and the final turns are provided by the protruding aluminium foil only. During the initial phase of the winding procedure the mandrel is heated to a temperature of 140° C. so that the glue in the tube formed from the protruding copper foil is melted. Likewise, the winding procedure is terminated by a heat-treatment of the cell, which is performed by pressing a 140° C. hot roll against the outer surface of the wound cell. This is done in order to melt the glue in the outer tube formed from the protruding aluminium foil.

The final heat-treatment is followed by withdrawal of the mandrel from the wound cell. At this stage of the manufacturing process the cell has an inner copper tube which extends beyond the wound battery laminate only at one end of the cell, and an outer aluminium tube which extends beyond the wound battery laminate at both ends of the cell.

The protruding part of the outer aluminium tube at the end containing no protruding part of copper tube is folded into the axial hole of the cell so as to seal off the cell and to provide a negative terminal. The protruding part of aluminium tube is folded inwardly onto the outer surface of the protruding part of inner copper tube so as to seal off the cell and to provide a positive terminal.

The electrochemical cell obtained is hermetically sealed, and more particularly, the current collector metal foils provide a water-impermeable seal. The glue present between the two current collectors provides an electrical insulation sufficient for avoiding short-circuiting of the cell.

What is claimed is:

1. A wound electrochemical cell formed as a coil with a first and a second coil edge and wound from a laminate having a length and a width, a first and a second edge extending along the length and a first and a second end extending along the width, the laminate being wound in a length direction from the first end to the second end in at least five turns, including an initial turn and a final turn, the laminate comprises a first electrode structure having a length and a width and a thickness, a first and a second edge extending along the length, and a first and a second end extending along the width, the first electrode structure consisting of a first current collector foil, coated on at least a part of a first and a part of a second side with a first electrode material;

a second electrode structure having a length and a width and a thickness, a first and a second edge extending along the length, and a first and a second end extending along the width, the second electrode structure consists of a second current collector foil, coated on at least a part of a first and a part of a second side with a second electrode material;

an electrolyte structure interposed between the first and the second electrode materials and thereby isolating the first and the second electrode materials from each other;

in at least the final turn and in the next to final turn, the first current collector has a protruding part extending beyond at least the first edge along the length of the second current collector, in at least the initial turn, the second current collector has a protruding part extending beyond the first edge along the length of the first collector, the protruding parts of the current collectors along at least the first edge of the laminate are sealed together.

2. A wound electrochemical cell according to claim 1, wherein the first current collector has a protruding part extending beyond the second edge of the second collector foil in at least the final turn.

3. A wound electrochemical cell according to claim 1, wherein one of the first and second electrode materials is an anode material and the other of the first and second electrode materials is a cathode material.

4. A wound electrochemical cell according to claim 1, wherein the electrolyte system comprises:

(a) a salt, wherein said salt is an alkali salt or a quaternary ammonium salt of $ClO_4{-}$, $CF_3SO_3{-}$, $AsF_6{-}$, $PF_6{-}$ or $BF_4{-}$, or any mixture of such alkali or ammonium salts;

(b) a solvent selected from a group consisting of alicyclic carbonates, aliphatic carbonates, lactones, esters, glymes and mixtures thereof;

(c) a separator consisting of a porous structure made from a polymer; and, (d) a crosslinked or non-crosslinked polymer produced by UV or heat induced polymerization of monomers or oligomers containing one or more polymerizable functional groups.

5. A wound electrochemical cell according to claim 1, wherein the protruding parts of the current collectors of the laminate are sealed to each other by a hot-melt glue.

6. A wound electrochemical cell according to claim 1, wherein the current collectors independently of each other are selected from electrically conductive foils.

7. A wound cell according to claim 6, wherein the thickness of the current collectors is between 5 and 40 $\mu$m.

8. A wound electrochemical cell according to claim 1, wherein the cathode material comprises as electrochemically active material one or more of spinel lithium manganese oxides, lithium cobalt oxides, lithium nickel oxides, vanadium oxides or titanium disulphide.

9. A wound electrochemical cell according to claim 1, wherein the anode material comprises as electrochemically active material an Li-intercalated carbon material.

10. A wound electrochemical cell according to claim 1, wherein the laminate is wound from 7 to 20 turns.

11. A wound electrochemical cell according to claim 1, wherein the laminate in at least the initial turn consists of the second current collector foil alone, the width of the second current collector foil in at least this initial turn being wider than the first current collector foil and extending beyond one or both of the edges of the first turn of the first current collector foil to form protruding parts, and at least this initial turn of the second current collector foil being non-electrode-coated.

12. A wound electrochemical cell according to claim 1, wherein the laminate in at least the final turn consists of the first current collector foil alone, the width of the first current collector foil in at least this final turn being wider than the second current collector foil and extending beyond both of the edges of the last turn of the second current collector foil to form protruding parts, and at least this final turn of the first current collector foil being non-electrode-coated.

13. A wound electrochemical cell according to claim 11, wherein the protruding parts of the first current collector foil along the first and the second edge of the laminate are sealed to the protruding parts of the second current collector foil along the first and the second edge of the laminate, the sealing extend along a first and a second encircling edge of the cell.

14. A wound electrochemical cell according to claim 11, wherein the cell has an axial hole.

15. A wound electrochemical cell according to claim 11, wherein the protruding parts in at least the final turn of the first current collector along the second edge of the laminate are folded inwardly into an axial hole and sealed to the inner surface of the cell.

16. A method for the manufacture of a wound electrochemical cell as defined in claim 1 comprising the steps of:

i) providing a battery laminate having a length and a width, a first and a second edge extending along its length and a first and a second end extending along its width and comprising a first electrode structure having a length and a width and a thickness, a first and a second edge extending along its length, and a first and a second end extending along its width, the first electrode structure consisting of a first current collector foil, coated on at least a part of its first and a part of its second side with a first electrode material;

a second electrode structure having a length and a width and a thickness, a first and a second edge extending along its length, and a first and a second end extending along its width, the second electrode structure consisting of a second current collector foil, coated on at least a part of its first and a part of its second side with a second electrode material;

an electrolyte structure interposed between the first and the second electrode materials and thereby isolating the first and the second electrode materials from each other; and ii) winding said laminate from the first end to the second end in the length direction of the laminate; in at least the initial turn, the second current collector has a protruding part extending beyond the first edge of the first collector; and iii) sealing the protruding parts of the current collectors along at least the first edge of the laminate together.

17. A method according to claim 16, wherein the protruding parts are sealed by gluing.

18. A method according to claim 16, wherein the laminate is wound onto a rod-shaped element.

19. A method according to claim 18, further comprising the step of folding protruding parts in at least the final turn of the first current collector foil inwardly along the second edge of the laminate into the axial hole, and sealing these parts to the inner surface of the cell.

20. A method according to claim 16, wherein the laminate is wound onto a flat core.

21. A method according to claim 20, comprising the step of pressing together the protruding parts of the current collectors so as to seal off the cell.

22. A method according to claim 20, comprising the step of winding an electrically insulating cover film onto the wound battery laminate.

23. A wound electrochemical cell according to claim 1, wherein parts of the current collectors are not coated with electrode material and an isolating material is provided for isolating the non-electrode coated parts of the current collectors from each other.

24. A wound electrochemical cell according to claim 1, wherein the protruding parts of the current collectors are at least partly free of electrode material.

25. A wound electrochemical cell according to claim 1, wherein an insulating polymer material is interposed between the protruding parts of the current collectors.

26. A wound electrochemical cell according to claim 2, wherein the protruding parts of the current collectors are at least partly free of electrode material.

27. A wound electrochemical cell according to claim 11, wherein the protruding part in at least the final turn of the first current collector along the first edge of the laminate is folded into sealing contact with the outer surface of the protruding part of the second current collector in the initial turn.

28. A method according to claim 18, further comprising the step of folding the protruding part in at least the final turn of the first current collector along the first edge of the laminate into sealing contact with the outer surface of the protruding part of the second current collector in the initial turn.

29. The wound electrochemical cell of claim 4 wherein the polymer in (d) is non-crosslinked.

30. The wound electrochemical cell of claim 4 wherein the separator is a member selected from the group consisting of polyethylene, polypropylene, polyesters, polycarbonates and cellulose.

31. The wound electrochemical cell of claim 4 wherein the polymer in (d) is selected from the group consisting of non-crosslinkable polyester, polyurethane, polyether and polyacrylate.

32. The wound electrochemical cell of claim 6 wherein at least one of the first and second current collectors are selected from the group consisting of metal foils, aluminum foil, copper foil and nickel foil.

33. The wound electrochemical cell of claim 7 wherein the thickness is between 5 $\mu$m and 25 $\mu$m.

34. The wound electrochemical cell of claim 8 wherein the cathode material comprises a member selected from the group consisting of $V_6O_{13}$ and titanium disulphide.

35. The wound electrochemical cell of claim 10 wherein the laminate is wound from 8 to 15 turns.

36. The method of claim 17 wherein gluing is performed with hot-melt glue.

37. The method of claim 18 wherein the rod-shaped element is a cylindrical mandrel with a substantially cylindrical axial hole.

38. A wound electrochemical cell according to claim 4, wherein the salt is $LiAsF_6$, $LiPF_6$, $N(Et)_4PF_6$, $N(Bu)_4PF_6$ or any mixtures thereof.

* * * * *